US012495347B2

(12) United States Patent
Ali et al.

(10) Patent No.: US 12,495,347 B2
(45) Date of Patent: Dec. 9, 2025

(54) APPARATUS, METHODS, AND COMPUTER PROGRAMS

(71) Applicant: Nokia Technologies Oy, Espoo (FI)

(72) Inventors: Amaanat Ali, Espoo (FI); Srinivasan Selvaganapathy, Bangalore (IN); Ahmad Awada, Munich (DE); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 18/552,354

(22) PCT Filed: Mar. 22, 2022

(86) PCT No.: PCT/EP2022/057401
§ 371 (c)(1),
(2) Date: Sep. 25, 2023

(87) PCT Pub. No.: WO2022/207399
PCT Pub. Date: Oct. 6, 2022

(65) Prior Publication Data
US 2024/0205779 A1    Jun. 20, 2024

(30) Foreign Application Priority Data
Mar. 31, 2021 (IN) .............................. 202141014813

(51) Int. Cl.
*H04W 36/30* (2009.01)
*H04W 36/00* (2009.01)

(52) U.S. Cl.
CPC ..... *H04W 36/305* (2018.08); *H04W 36/0061* (2013.01); *H04W 36/304* (2023.05)

(58) Field of Classification Search
CPC ........... H04W 36/0061; H04W 36/304; H04W 36/305; H04W 36/36; H04W 36/362;
(Continued)

(56) References Cited

U.S. PATENT DOCUMENTS 11,477,707 B2 * 10/2022 Paladugu .............. H04W 76/27
12,200,552 B2 *  1/2025 Sun ................. H04W 36/00835
(Continued)

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.3.0, Sep. 2020, pp. 1-83.
(Continued)

*Primary Examiner* — Frank Duong
(74) *Attorney, Agent, or Firm* — Nokia Technologies Oy

(57) ABSTRACT

The following relates to an apparatus for a terminal, the apparatus comprising: means for receiving, from a master access point, assistance information, the assistance information comprising configuration information for a first candidate Primary Secondary Cell, PSCell, and a second candidate PSCell, and a first indication of whether the first and second candidate PSCell are associated with a common master cell configuration; and means for determining a failure condition that occurred when connecting with the first candidate PSCell; means for, in response to the determining, using the first indication to determine whether to attempt to connect with the second candidate PSCell.

15 Claims, 7 Drawing Sheets

(58) Field of Classification Search
CPC ..... H04W 76/18; H04W 76/30; H04W 76/34; H04W 76/36
See application file for complete search history.

(56) References Cited

U.S. PATENT DOCUMENTS

| | | | | |
|---|---|---|---|---|
| 12,262,271 | B2* | 3/2025 | Purkayastha | H04W 76/36 |
| 12,262,275 | B2* | 3/2025 | Deenoo | H04W 76/20 |
| 2021/0099926 | A1* | 4/2021 | Chen | H04W 36/362 |
| 2023/0016688 | A1* | 1/2023 | Li | H04W 36/362 |
| 2023/0143942 | A1* | 5/2023 | Wu | H04W 36/0055 370/311 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"Msc-generator", Sourceforge, Retrieved on Oct. 4, 2023, Webpage available at : https://sourceforge.net/projects/msc-generator/.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.

"Report on Offline Discussion [108] agreeable proposals on Conditional PSCell Addition/Change (CATT)", 3GPP TSG-RAN WG2 Meeting #108, R2-1916329, Agenda: 6.9.4, CATT, Nov. 18-22, 2019, 15 pages,.

International Search Report and Written Opinion received for corresponding Patent Cooperation Treaty Application No. PCT/EP2022/057401, dated Jul. 28, 2022, 10 pages.

"Handling of multiple candidate cells for CPAC", 3GPP TSG-RAN WG2 Meeting #108, R2-1914986, Agenda: 6.9.4, Futurewei, Nov. 18-22, 2019, 4 pages.

\* cited by examiner

APPARATUS, METHODS, AND COMPUTER PROGRAMS

RELATED APPLICATION

This application claims priority to PCT Application No. PCT/EP2022/057401, filed on Mar. 22, 2022, which claims priority to IN Provisional Application No. 202141014813, filed on Mar. 31, 2021, each of which is incorporated herein by reference in its entirety.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for a terminal, the apparatus comprising: at least one processor; and at least one memory comprising code that, when executed by the at least one apparatus, causes the terminal to: receive, from a master access point, assistance information, the assistance information comprising configuration information for a first candidate Primary Secondary Cell, PSCell, and a second candidate PSCell, and a first indication of whether the first and second candidate PSCell are associated with a common master cell configuration; and determine a failure condition that occurred when connecting with the first candidate PSCell; and in response to the determining, use the first indication to determine whether to attempt to connect with the second candidate PSCell.

The terminal may be caused to, when it is determined to attempt to connect with the second candidate PSCell, transmit to the master access point a second indication that connection to the second candidate PSCell is being or will be attempted.

The second indication may comprise an indication of said failure condition.

The terminal may be caused to determine whether a quality of a link from the terminal to the second candidate PSCell is greater than a threshold value, and continue to connect to the second candidate PSCell when said quality is greater than the threshold.

The terminal may be caused to, when it is determined to not attempt to connect with the second candidate PSCell, send an indication of said failure condition.

The first indication may be comprised within a bitmap, each position in the bitmap corresponding to a conditional PSCell change configuration.

The terminal may be caused to: receive from the master node a threshold for a quality metric; measure a quality of a link between the apparatus and at least one of the first and second candidate PSCells during a connection establishment procedure; and abandon the connection establishment procedure when the measured quality is below the threshold.

According to a second aspect, there is provided an apparatus for a master access point, the apparatus comprising: at least one processor; and at least one memory comprising code that, when executed by the at least one apparatus, causes the master access point to: transmit, to a terminal, assistance information, the assistance information comprising configuration information for a first Primary Secondary Cell, candidate PSCell, and a second candidate PSCell, and a first indication of whether the first and second candidate PSCell are associated with a common master cell configuration.

The master access point may be caused to obtain the configuration information for each of the first and second candidate PSCell from at least one other access point.

The master access point may be caused to receive, from the terminal, signalling indicating that a failure condition has occurred when the terminal attempted to connect with the first candidate PSCell, The master access point may be caused to receive, from the terminal signalling indicating that a connection with the second candidate PSCell will be, or is being attempted by the terminal.

The first indication may be comprised within a bitmap, each position in the bitmap corresponding to a conditional PSCell change configuration.

The master access point may be caused to transmit to the terminal a threshold for a quality metric for a link between the terminal and at least one of the first and second candidate PSCells.

According to a third aspect, there is provided an apparatus for a terminal, the apparatus comprising: means for receiving, from a master access point, assistance information, the assistance information comprising configuration information for a first candidate Primary Secondary Cell, PSCell, and a second candidate PSCell, and a first indication of whether the first and second candidate PSCell are associated with a common master cell configuration; and means for determining a failure condition that occurred when connecting with the first candidate PSCell; means for, in response to the determining, using the first indication to determine whether to attempt to connect with the second candidate PSCell.

The apparatus may comprise means for, when it is determined to attempt to connect with the second candidate PSCell, transmitting to the master access point a second indication that connection to the second candidate PSCell is being or will be attempted.

The second indication may comprise an indication of said failure condition.

The apparatus may comprise means for determining whether a quality of a link from the terminal to the second candidate PSCell is greater than a threshold value, and means for continuing to connect to the second candidate PSCell when said quality is greater than the threshold.

The apparatus may comprise means for, when it is determined to not attempt to connect with the second candidate PSCell, sending an indication of said failure condition.

The first indication may be comprised within a bitmap, each position in the bitmap corresponding to a conditional PSCell change configuration.

The apparatus may comprise: means for receiving from the master node a threshold for a quality metric; means for measuring a quality of a link between the apparatus and at least one of the first and second candidate PSCells during a connection establishment procedure; and means for abandoning the connection establishment procedure when the measured quality is below the threshold.

According to a fourth aspect, there is provided an apparatus for a master access point, the apparatus comprising: means for transmitting, to a terminal, assistance information, the assistance information comprising configuration information for a first Primary Secondary Cell, candidate PSCell, and a second candidate PSCell, and a first indication of whether the first and second candidate PSCell are associated with a common master cell configuration.

The apparatus may comprise means for obtaining the configuration information for each of the first and second candidate PSCell from at least one other access point.

The apparatus may comprise means for receiving, from the terminal, signalling indicating that a failure condition has occurred when the terminal attempted to connect with the first candidate PSCell, The apparatus may comprise means for receiving, from the terminal signalling indicating that a connection with the second candidate PSCell will be, or is being attempted by the terminal.

The first indication may be comprised within a bitmap, each position in the bitmap corresponding to a conditional PSCell change configuration.

The apparatus may comprise means for transmitting to the terminal a threshold for a quality metric for a link between the terminal and at least one of the first and second candidate PSCells.

According to a fifth aspect, there is provided a method for an apparatus for a terminal, the method comprising: receiving, from a master access point, assistance information, the assistance information comprising configuration information for a first candidate Primary Secondary Cell, PSCell, and a second candidate PSCell, and a first indication of whether the first and second candidate PSCell are associated with a common master cell configuration; determining a failure condition that occurred when connecting with the first candidate PSCell; and, in response to the determining, using the first indication to determine whether to attempt to connect with the second candidate PSCell.

The method may comprise, when it is determined to attempt to connect with the second candidate PSCell, transmitting to the master access point a second indication that connection to the second candidate PSCell is being or will be attempted.

The second indication may comprise an indication of said failure condition.

The method may comprise determining whether a quality of a link from the terminal to the second candidate PSCell is greater than a threshold value, and continuing to connect to the second candidate PSCell when said quality is greater than the threshold.

The method may comprise, when it is determined to not attempt to connect with the second candidate PSCell, sending an indication of said failure condition.

The first indication may be comprised within a bitmap, each position in the bitmap corresponding to a conditional PSCell change configuration.

The method may comprise: receiving from the master node a threshold for a quality metric; measuring a quality of a link between the apparatus and at least one of the first and second candidate PSCells during a connection establishment procedure; and abandoning the connection establishment procedure when the measured quality is below the threshold.

According to a sixth aspect, there is provided a method for an apparatus for a master access point, the method comprising: transmitting, to a terminal, assistance information, the assistance information comprising configuration information for a first Primary Secondary Cell, candidate PSCell, and a second candidate PSCell, and a first indication of whether the first and second candidate PSCell are associated with a common master cell configuration.

The method may comprise obtaining the configuration information for each of the first and second candidate PSCell from at least one other access point.

The method may comprise receiving, from the terminal, signalling indicating that a failure condition has occurred when the terminal attempted to connect with the first candidate PSCell, The method may comprise receiving, from the terminal signalling indicating that a connection with the second candidate PSCell will be, or is being attempted by the terminal.

The first indication may be comprised within a bitmap, each position in the bitmap corresponding to a conditional PSCell change configuration.

The method may comprise transmitting to the terminal a threshold for a quality metric for a link between the terminal and at least one of the first and second candidate PSCells.

According to a seventh aspect, there is provided an apparatus for a terminal, the apparatus comprising: receiving circuitry for receiving, from a master access point, assistance information, the assistance information comprising configuration information for a first candidate Primary Secondary Cell, PSCell, and a second candidate PSCell, and a first indication of whether the first and second candidate PSCell are associated with a common master cell configuration; determining circuitry for determining a failure condition that occurred when connecting with the first candidate PSCell; using circuitry for, in response to the determining, using the first indication to determine whether to attempt to connect with the second candidate PSCell.

The apparatus may comprise transmitting circuitry for, when it is determined to attempt to connect with the second candidate PSCell, transmitting to the master access point a second indication that connection to the second candidate PSCell is being or will be attempted.

The second indication may comprise an indication of said failure condition.

The apparatus may comprise determining circuitry for determining whether a quality of a link from the terminal to the second candidate PSCell is greater than a threshold value, and continuing circuitry for continuing to connect to the second candidate PSCell when said quality is greater than the threshold.

The apparatus may comprise sending circuitry for, when it is determined to not attempt to connect with the second candidate PSCell, sending an indication of said failure condition.

The first indication may be comprised within a bitmap, each position in the bitmap corresponding to a conditional PSCell change configuration.

The apparatus may comprise: receiving circuitry for receiving from the master node a threshold for a quality metric; measuring circuitry for measuring a quality of a link between the apparatus and at least one of the first and second candidate PSCells during a connection establishment procedure; and abandoning circuitry for abandoning the connection establishment procedure when the measured quality is below the threshold.

According to an eighth aspect, there is provided an apparatus for a master access point, the apparatus comprising: transmitting circuitry for transmitting, to a terminal, assistance information, the assistance information comprising configuration information for a first Primary Secondary Cell, candidate PSCell, and a second candidate PSCell, and a first indication of whether the first and second candidate PSCell are associated with a common master cell configuration.

The apparatus may comprise obtaining circuitry for obtaining the configuration information for each of the first and second candidate PSCell from at least one other access point.

The apparatus may comprise receiving circuitry for receiving, from the terminal, signalling indicating that a failure condition has occurred when the terminal attempted to connect with the first candidate PSCell, The apparatus may comprise receiving circuitry for receiving, from the terminal signalling indicating that a connection with the second candidate PSCell will be, or is being attempted by the terminal.

The first indication may be comprised within a bitmap, each position in the bitmap corresponding to a conditional PSCell change configuration.

The apparatus may comprise transmitting circuitry for transmitting to the terminal a threshold for a quality metric for a link between the terminal and at least one of the first and second candidate PSCells.

According to a ninth aspect, there is provided non-transitory computer readable medium comprising program instructions for causing an apparatus for a terminal to perform at least the following: receive, from a master access point, assistance information, the assistance information comprising configuration information for a first candidate Primary Secondary Cell, PSCell, and a second candidate PSCell, and a first indication of whether the first and second candidate PSCell are associated with a common master cell configuration; and determine a failure condition that occurred when connecting with the first candidate PSCell; and in response to the determining, use the first indication to determine whether to attempt to connect with the second candidate PSCell.

The terminal may be caused to, when it is determined to attempt to connect with the second candidate PSCell, transmit to the master access point a second indication that connection to the second candidate PSCell is being or will be attempted.

The second indication may comprise an indication of said failure condition.

The terminal may be caused to determine whether a quality of a link from the terminal to the second candidate PSCell is greater than a threshold value, and continue to connect to the second candidate PSCell when said quality is greater than the threshold.

The terminal may be caused to, when it is determined to not attempt to connect with the second candidate PSCell, send an indication of said failure condition.

The first indication may be comprised within a bitmap, each position in the bitmap corresponding to a conditional PSCell change configuration.

The terminal may be caused to: receive from the master node a threshold for a quality metric; measure a quality of a link between the apparatus and at least one of the first and second candidate PSCells during a connection establishment procedure; and abandon the connection establishment procedure when the measured quality is below the threshold.

According to a tenth aspect, there is provided non-transitory computer readable medium comprising program instructions for causing an apparatus for a master access point to perform at least the following: transmit, to a terminal, assistance information, the assistance information comprising configuration information for a first Primary Secondary Cell, candidate PSCell, and a second candidate PSCell, and a first indication of whether the first and second candidate PSCell are associated with a common master cell configuration.

The master access point may be caused to obtain the configuration information for each of the first and second candidate PSCell from at least one other access point.

The master access point may be caused to receive, from the terminal, signalling indicating that a failure condition has occurred when the terminal attempted to connect with the first candidate PSCell, The master access point may be caused to receive, from the terminal signalling indicating that a connection with the second candidate PSCell will be, or is being attempted by the terminal.

The first indication may be comprised within a bitmap, each position in the bitmap corresponding to a conditional PSCell change configuration.

The master access point may be caused to transmit to the terminal a threshold for a quality metric for a link between the terminal and at least one of the first and second candidate PSCells.

According to an eleventh aspect, there is provided a computer program comprising program instructions for causing a computer to perform any method as described above.

According to a twelfth aspect, there is provided a computer program product stored on a medium that may cause an apparatus to perform any method as described herein.

According to a thirteenth aspect, there is provided an electronic device that may comprise apparatus as described herein.

According to a fourteenth aspect, there is provided a chipset that may comprise an apparatus as described herein.

BRIEF DESCRIPTION OF FIGURES

Examples will now be described, by way of example only, with reference to the accompanying Figures in which.

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIG. 1.

Figure 1:
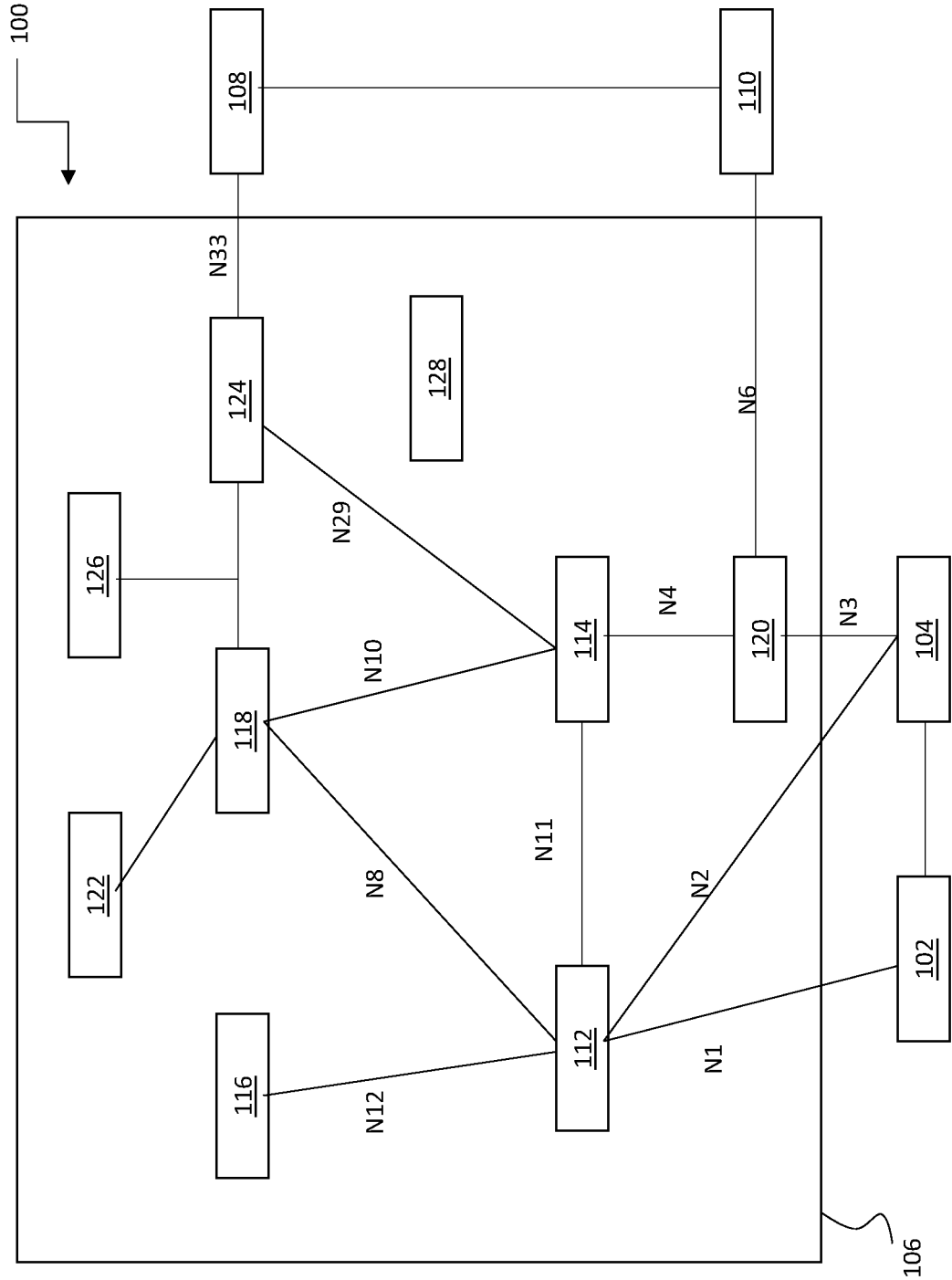
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

3GPP refers to a group of organizations that develop and release different standardized communication protocols. They are currently developing and publishing documents related to Release 16, relating to 5G technology, with Release 17 currently being scheduled for 2022.

3GPP defines several types of access nodes (also referred to herein as access points) for allowing a UE to access a network. Where communication to and/or from the UE is effected through multiple access points, these may be considered in the context of a master node and a secondary node, were each node acts as one of the multiple access points. A master node is a node/access point that routes control plane communications for a particular UE. A secondary node/access point does not route control plane communications for that UE, but does provide additional radio resources to the UE for the UE to access the network.

Each of the master and secondary nodes may provide one or more cells for providing resources to the UE for exchanging signalling for the UE to access the communication. To this effect, there is provided the concept of "cell groups", both a "master cell group" and a "secondary cell group", from the UEs point of view. The master cell group is provided by the master node, and provides a primary cell for the UE (see below). Each cell may be considered as being associated with a particular frequency.

The initial cell in the master cell group that the UE uses in the master cell to establish and/or to re-establish a Radio Resource Control (RRC) connection is known as a primary cell (PCell). The PCell is used for exchanging control plane information to and on behalf of the UE. Similarly, there is a "primary" cell associated with the secondary node in the secondary cell group. This primary cell is labelled as the Primary Secondary Cell, PSCell. In some architecture options, the PSCell may also be used to exchange control plane signalling with the UE. All other cells provided by the master and secondary nodes are labelled secondary cells.

Thus, a master cell group is a group of serving cells implemented by the master node, and comprises both a PCell and optionally one or more SCells provided by the master node. Similarly, the secondary cell group is a group of serving cells implemented by a secondary node, comprising the PSCell and optionally one or more Scells. Master cell groups and secondary cell groups are concepts under dual connectivity (DC).

As changes to the PCell and PSCell are defined in terms of certain functions they perform, special procedures have been developed to define what happens when at least one of these cells change.

One of these procedures is known as Conditional PSCell Change (CPC). CPC is a type of conditional handover that happens when the radio/network conditions reaches at least one predetermined execution criteria. In particular, CPC is defined as a PSCell change that is executed by the UE when predetermined execution condition(s) are met. To achieve this, a master node obtains configuration information relating to a plurality of target cells and provides this to a UE as CPC configuration information. Each CPC configuration is associated with at least one execution condition.

Upon receipt of a CPC configuration, the UE starts evaluating the execution condition(s) associated with this CPC configuration, but does not attempt any handover at that point. A handover would instead occur when the predetermined execution condition(s) associated with the received CPC configuration are met. When this happens, the UE stops evaluating the execution condition(s) and triggers a PSCell change at the same time. Only intra-Secondary node CPC is supported in Release-16, which means that only a secondary cell maintained by the secondary node can become the new PSCell when a change from an old PSCell is triggered.

According to Release 16, the following principles apply to CPC in respect of changing and/or releasing a PSCell.

Initially, a CPC configuration is defined. As mentioned above, the CPC configuration comprises the configuration of CPC candidate PSCell(s) and execution condition(s) generated by the secondary node. The CPC configuration defined by the secondary node is provided to the master node for forwarding to the UE.

An execution condition may comprise trigger condition(s) (currently defined as being only one or two trigger conditions in 3GPP specifications). Example trigger conditions include CPC events A3/A5, as defined in 3GPP TS 38.331: "NR; Radio Resource Control (RRC) protocol specification". Only a single Reference Signal type is supported, and at most two different trigger quantities can be configured simultaneously for the evaluation of a CPC execution condition of a single candidate PSCell. Example trigger conditions include, for example, Reference Signal Received Power (RSRP), Reference Signal Received Quality (RSRQ), and Signal and Interference to Noise Ratio (SINR), etc.

While executing the CPC, the UE is not required to continue evaluating the execution condition of other candidate PSCell(s). Once the CPC procedure is executed successfully, the UE releases all stored CPC configurations. The stored CPC configurations upon the release of Secondary Cell Group.

This CPC monitoring may be abandoned when a PSCell change command or PCell change command is received. When such a change command is received, the UE executes the PSCell/PCell change procedure as described in the operating specifications and stops monitoring the execution condition(s). Currently, the PSCell change procedure is defined in clause 10.3 and 10.5 of 3GPP TS 38.331, and also in clause 9.2.3.2 in TS 38.300, This PSCell change procedure is performed regardless of any previously received CPC configuration. Upon the successful completion of PSCell change procedure or PCell change procedure, the UE releases all stored CPC configurations.

Another process described in the 3GPP Technical Specifications is a process that may be used when a master node adds a secondary cell group. This process is known as a secondary cell group addition (SCG-Addition) procedure, and is currently defined in section 10.2 of TS 37.340.

In this SCG-Addition procedure, a UE initially receives an SCG-Addition configuration message that comprises a configuration for a secondary cell group. This SCG-Addition configuration may be received as part of an RRC-Reconfiguration message from the master node. On receiving the SCG-Addition configuration, the UE applies the secondary cell group configuration comprised therein, and informs the master node that this configuration has been applied. This may be performed, for example, by sending an RRC-Reconfiguration-complete message to the master node.

Based on the specific UE implementation, in parallel to sending this configuration confirmation or later, the UE attempts a Random Access Channel (RACH) access procedure on the PSCell of the secondary cell group. If this RACH access fails, the UE sends a message indicating this failure to the master node. This message may be, for example, an SCG-failure-Indication.

At the time of sending the SCG-Failure-Indication, the UE is still operating with the secondary cell group configuration received in the initial message from the master node.

In response to the SCG-Failure-Indication, the master node contacts the secondary node to provide a new configuration to mitigate the failure situation. This new configuration may be the addition of another secondary cell group or the release of the existing secondary cell group configuration. When it is a new secondary cell group addition, the master node may use the last applied secondary cell group configuration for preparation.

The following considers an alternative mechanism for a UE to perform recovery during an SCG-Addition procedure. In particular, the following considers recovery during Conditional PSCell addition (CPA) failure. CPA relates to a PSCell addition process that is dependent on a UE determining that at least one execution criteria has been fulfilled before performing the PSCell addition process. This has not previously been considered in 3GPP specifications. Instead, 3GPP specifications simply consider PSCell addition, which is a process that is performed automatically in response to a reconfiguration message being received by a UE.

The general framework for CPA is similar to CPC, with the difference that a target PSCell is added for the first time in CPA, which leads to dual connectivity establishment instead of the PSCell merely being changed.

However, applying the defined mechanism for CPC failure to CPA failure would result in several drawbacks. For example, the UE may already have more than one CPA target prepared and these may be used for initiating a recovery rather than wasting signalling resources and increasing the time for recovery as the response from the network to a SCG-Failure-Indication message may take potentially hundreds of milliseconds. Moreover there will be additional interruption for the bearers mapped to secondary cell group as part of the CPA configuration until the master node reconfigures the UE with a new RRC message.

The following aims to address at least one of these above-mentioned issued by developing an optimized procedure for CPA recovery when CPA with multiple target cells is prepared at the UE.

The following relates to a case of CPA with multiple target PSCells prepared for CPA, each target CPA configuration comprising a master cell group configuration part and a secondary cell group configuration part in the RRC reconfiguration message sent by the MN to the UE. The master cell group part of the CPA configuration (and likewise, the secondary cell group part of the CPS configuration) may be the same or different across different candidate CPA configurations depending on how the UE capabilities are split across the master cell group and the secondary cell group for different master node and secondary cell pairs.

To enable CPA recovery, a new procedure is provided that utilizes the communication network to provide assistance information related to CPA recovery. This assistance information may indicate which of those candidate CPA configurations have the same master cell group configuration. This assistance information may be provided as illustrated in the examples below.

In the presently described examples, when a failure is detected, the UE may attempt to recover the addition procedure by instead applying any of the pending CPA configurations provided by the master node for those CPA configurations having the same master cell group part. Whether or not the master cell group is the same may be determined by the UE based on an indication from the network in the assistance information. Requiring the recovery CPA configuration to comprise the same master cell group part avoids delta signalling-related reconfiguration failure because the UE has already applied the master cell group part of the configuration at the start of execution, where delta signalling is a type of signalling where the network sends to the UE a difference (i.e. delta) compared to the current configuration the UE uses.

Further, the master node may be aware of the configuration of each CPA, including which CPA candidates share the same master cell group. As mentioned above, this information may be shared with the UE to assist and accelerate CPA recovery (e.g. as part of the above-mentioned assistance information). The master node may include an additional identifier in the assistance information that identifies those CPA configurations having same master cell group configuration in a message to the UE.

The master node may also include minimum receive signal level to be satisfied for the CPA recovery in the RRC Reconfiguration containing CPA configurations. These receive signal levels may subsequently be compared to measurements conducted for the PSCell associated with the CPA configuration to ensure that a minimum receive signal level is obtained.

Subsequently, when the UE initiates CPA recovery after the first failure, the UE may inform the master node about the identity of the target PSCell (either by providing an identity of the PSCell and/or by an identity of the CPA configuration that is executed by the UE after the first CPA failure). This may be useful for causing the network to change its data forwarding accordingly to account for the change to the target PSCell. This may be transmitted using, for example, a secondary cell group Failure Indication.

To make the above CPA recovery happen without UE necessarily sending SCG Failure Indication, the master node may indicate the candidate CPA configurations that can be considered as recovery targets by UE without sending a failure indication. Hence, RRC Signalling message for CPA may be updated to include a parameter in each CPA configuration indicating related configurations that share the same MCG part.

Figure 5A:
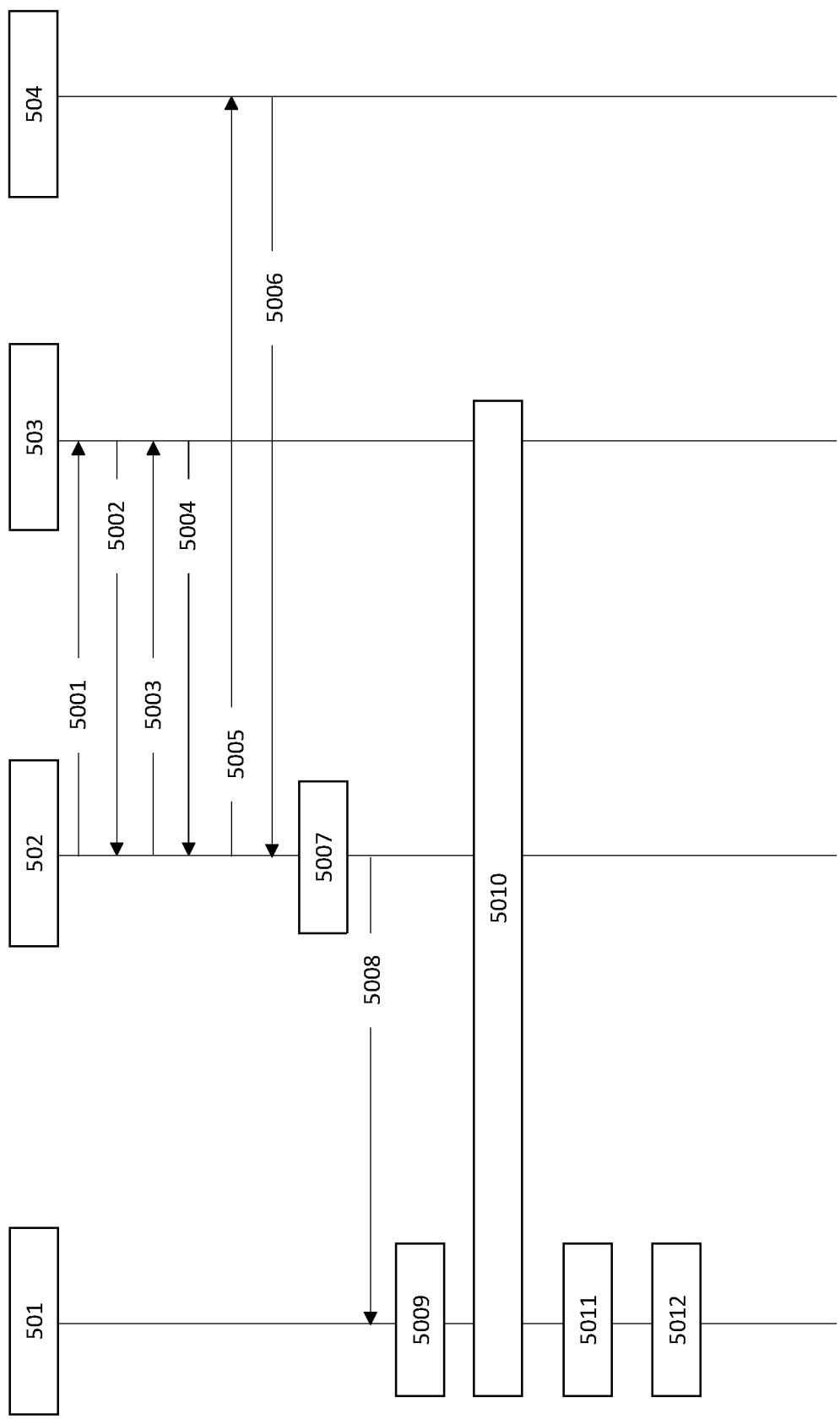
FIGS. 5A and 5B illustrate example signalling between elements in a communication system.
Figure 5B:
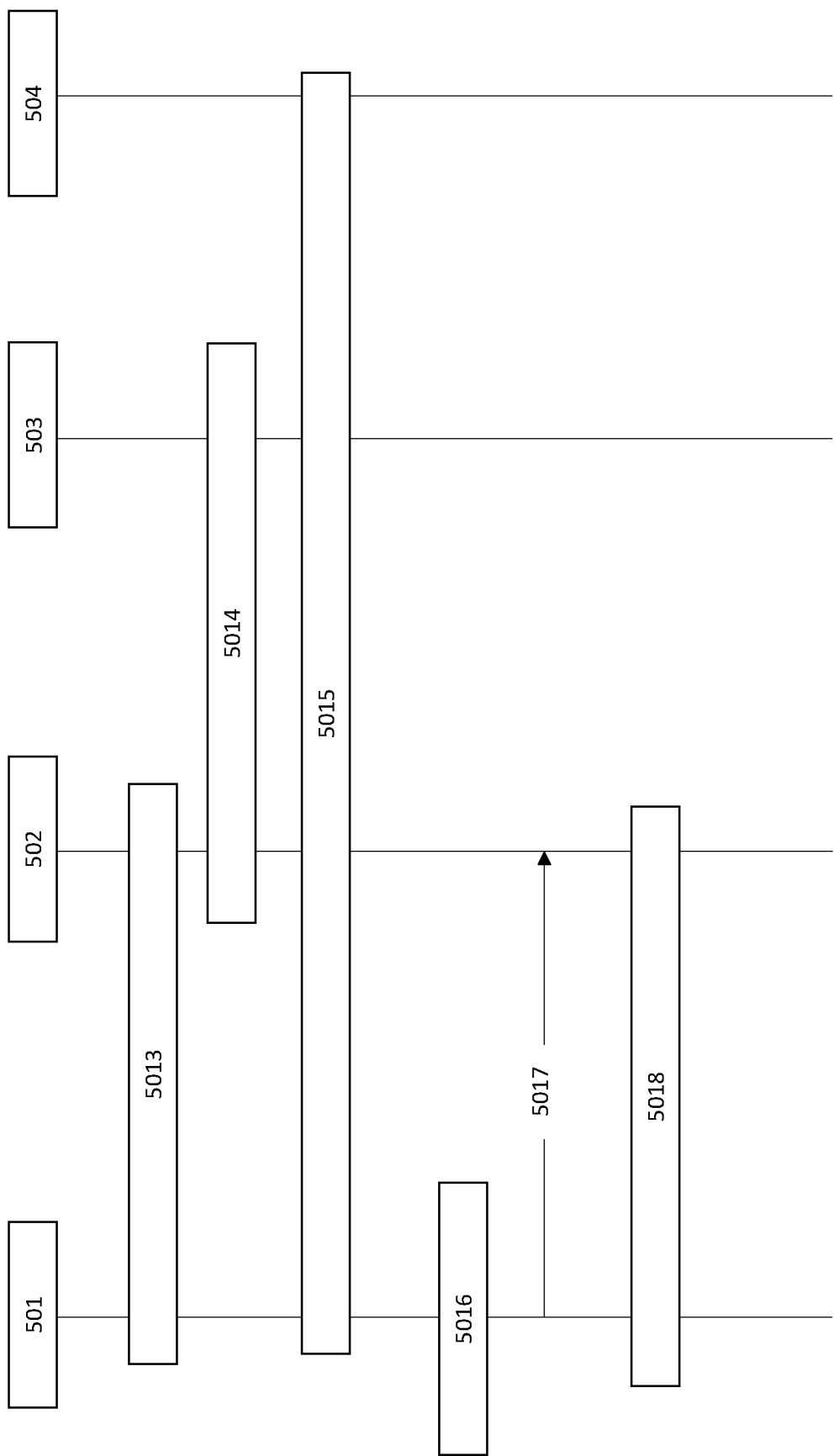

The following provides example signalling between a UE 501, a master node 502, a first secondary node 503 (SN1), and a second secondary node 504 (SN2), with reference to FIGS. 5A and 5B. The signalling of FIG. 5B is a continuation of the signalling of FIG. 5A, and follows subsequently in time.

Steps 5001 to 5004 relate to the master node 502 exchanging signalling for CPA preparation with SN1 503.

At 5001, the master node 502 sends a message to SN1 503. This message may be an addition request for a secondary gNB. This request may comprise a first "allowed" list for candidate PSCells. This request may comprise a master cell group configuration.

At 5002, SN1 503 responds to the message of 5001 with an acknowledgment. This acknowledgement may comprise a CPA configuration for a specific PSCell, PSCell X.

At 5003, the master node 502 sends another message to SN1 503. This message may be an addition request for a secondary gNB. This request may comprise a second "allowed" list for candidate PSCells. At least one of the listed cells on the first allowed list may not be comprised within the second allowed list. In other words, the first and second allowed lists may comprise different sets of cells. The request may comprise a master cell group configuration that is different to the master cell group configuration comprised in the message of 5001.

At 5004, SN1 503 responds to the message of 5003 with an acknowledgment. This acknowledgement may comprise a CPA configuration for a specific PSCell, PSCell Y. PSCell Y may be different to PSCell X.

Steps 5005 to 5006 relate to the master node 502 exchanging signalling for CPA preparation with SN2 504.

At 5005, the master node 502 sends a message to SN2 504. This message may be an addition request for a secondary gNB. This request may comprise a third "allowed" list for candidate PSCells. This third "allowed" list may be different to the first and second allowed lists mentioned above. The request contains the same master cell group configuration as provided in the message of 5001.

At 5006, SN2 504 responds to the message of 5001 with an acknowledgment. This acknowledgement may comprise a CPA configuration for a specific PSCell, PSCell Z. PSCell Z may be different to each of PSCell X and PSCell Y.

At 5007, the master node MN is aware that the MCG configuration is same for PSCell X and PSCell Z after the CPA preparation. As the complete configuration of each of PSCell X and PSCell Z comprises the same master cell group (with SCG as full configuration as new addition, since the MCG does not change), these two configurations may be mutually applied as a recovery configuration after CPA failure. Therefore, at 5007, the master node generates an indication representing this information as part of CPA-Recovery Information to indicate the CPA configuration-IDs which can be used for CPA recovery among each other. This indication may be in the form of a bitmap of N bits. For example, a bit position for CPA configuration ID may be set to 1 when it shares the same identifier with another CPA-configuration-ID position (i.e. if the identifier is repeated in the bitmap).

The master node may also identify a condition to be checked before a UE triggers another CPA after CPA failure. In one example, the CPA condition may be a simple check of signal strength and/or of signal quality. The CPA recovery information may also (or alternatively) comprise a threshold for difference between the measured values of best cell at the time of CPA failure and the selected cell for CPA recovery that satisfies the CPA recovery criteria. If the difference is more than the given threshold, the UE may proceed with SCG-Failure procedure than CPA recovery. This is because such a measurement would indicate that the CPA recovery in this case may not succeed as a result of likely strong interference.

At 5008, the master node 502 signals the generated CPA recovery parameters for PSCell X, PS Cell Y and PS Cell Z to the UE.

At 5009, the UE stores the CPA configuration and the recovery parameters signalled by the network in 5008.

At 5010, secondary cell group addition failure occurs for PSCell X. This failure may be, for example, the result of a random access channel (RACH) failure.

At 5011, the UE initiates CPA recovery based on its stored CPA configurations of 5009. In other words, instead of initiating transmission of the secondary cell group Failure Indication message to the master node, the UE instead initiates a CPA recovery procedure when the UE determines that PSCell Z satisfies the radio criteria and also has the configuration satisfying the CPA recovery (as they have the same master cell group configuration).

At 5012, the UE determines to, and applies, the CPA configuration of SN-2 for PSCell Z. In particular, the UE checks the radio quality threshold of the CPA recovery candidate (i.e. of PSCell Z in the present example) and also applies the SN-2 504 secondary cell group configuration.

At 5013, the UE 501 lets the master node 502 know that CPA recovery is in progress. This may be performed, for example, using an RRC reconfiguration complete message. This message may comprise at least one new information element. For example, there may be a new information element for indicating that CPA recovery is in progress. As another example, there may be a new information element indicating that a failure of SN-1 502 is the reason why CPA recovery is being performed.

At 5014, the master node 502 releases resources on SN-1 503 PSCell X as this candidate failed.

At 5015, the UE continues performing the secondary cell group addition procedure towards PSCell Z. If the procedure is successful, the UE may enter into dual connectivity with both the master node 502 and SN-2 504. This ends the CPA recovery procedure.

Steps 5016 to 5018 illustrate the case when the UE 501 determines that there are no suitable candidate PSCells available, and/or the network criteria (e.g. signal quality) are not met.

In this case, at 5016, the UE 501 determines that there are no suitable candidate PSCells available (e.g. if only PSCell X and PSCell Y are configured in the UE, and not PSCell Z), and/or the network criteria (e.g. signal quality) are not met.

At 5017, the UE 501 signals failure information for the secondary cell group to the master node 502.

At 5018, subsequent procedures defined in the specification related to the secondary group cell failure information are performed.

Figure 7:
FIGS. 6 and 7 are flow charts illustrating example operations that may be performed by apparatus described herein.
Figure 6:
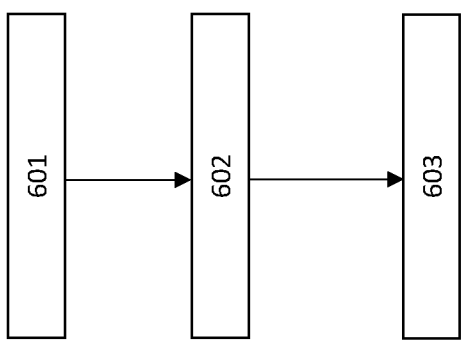

FIGS. 6 and 7 are flow charts illustrating example operations that may be performed by apparatuses described herein.

FIG. 6 is a flowchart illustrating potential operations that may be performed by an apparatus for a terminal.

At 601, the apparatus receives, from a master access point, assistance information. The assistance information comprises configuration information for a first candidate Primary Secondary Cell, PSCell, and a second candidate PSCell, and a first indication of whether the first and second candidate PSCell are associated with a common master cell configuration. The first candidate PSCell and the second candidate PSCell may be provided by a same node/access point. The first candidate PSCell and the second candidate PSCell may be provided by different nodes/access points.

The first indication may be provided in any of a plurality of different ways. As one example, the first indication may be comprised within a bitmap, each position in the bitmap corresponding to a conditional PSCell change configuration.

At 602, the apparatus determines that a failure condition has occurred when connecting with the first candidate PSCell.

The connecting may be attempted during a cell change operation. In particular, the connecting may be attempted when a PSCell is being changed and the master node/primary cell is not changed. Such a connecting attempt may be triggered in response to a determination that at least one execution condition configured in the terminal for the first candidate PSCell has been met. As discussed above, when the at least one execution condition has been met, a handover to the first candidate PSCell may be triggered at the terminal. It is understood that this monitoring of execution conditions is merely one mechanism for triggering PSCell handover, and that other mechanisms are also possible.

At 603, the apparatus, in response to the determining, uses the first indication to determine whether to attempt to connect with the second candidate PSCell.

When it is determined to attempt to connect with the second candidate PSCell, the apparatus may transmit, to the master access point, a second indication. The second indication may indicate that connection to the second candidate PSCell is being or will be attempted.

The second indication may comprise an indication of said failure condition.

The first indication may be provided in any of a plurality of different ways. As one example, the indication may be comprised within a bitmap, each position in the bitmap corresponding to a conditional PSCell change configuration. The value of a bit in the bitmap may be 1 when there is a common master cell group configuration. The value of a bit in the bitmap may be 0 when there is not a common master cell group configuration.

The apparatus may determine whether a quality of a link from the terminal to the second candidate PSCell is greater than a threshold value, and continue with the connection attempt to the second candidate PSCell when said quality is greater than the threshold. The apparatus may only continue with the connection attempt to the second candidate PSCell when said quality is greater than the threshold. The quality may be a measured quality that is measured, at least in part, by the terminal. The quality may be, for example, a received signal power, a received signal quality, a signal to noise and interference ratio, etc.

The apparatus may receive, from the master node, a threshold for a quality metric. The quality metric may be a minimum acceptable quality that must be met by the link. The apparatus may measure a quality of a link between the apparatus and at least one of the first and second candidate PSCells during a connection establishment procedure. The apparatus may abandon the connection establishment procedure when the measured quality is below the threshold.

When the apparatus determines to not attempt to connect with the second candidate PSCell, the apparatus may send an indication of said failure condition. It is understood that the failure condition may be sent when the apparatus determines to not attempt to connect with any other candidate PSCell configured in the terminal.

FIG. 7 is a flow chart illustrating potential operations that may be performed by an apparatus for a master access point. The apparatus/master access point may interact with the terminal described above in relation to FIG. 6.

At 701, the apparatus transmits, to a terminal, assistance information, the assistance information. The assistance information comprises configuration information for a first Primary Secondary Cell, candidate PSCell, and a second candidate PSCell, and a first indication of whether the first and second candidate PSCell are associated with a common master cell configuration. The first candidate PSCell and the second candidate PSCell may be provided by a same node/access point. The first candidate PSCell and the second candidate PSCell may be provided by different nodes/access points.

The first indication may be provided in any of a plurality of different ways. As one example, the first indication may be comprised within a bitmap, each position in the bitmap corresponding to a conditional PSCell change configuration. The value of a bit in the bitmap may be 1 when there is a common master cell group configuration. The value of a bit in the bitmap may be 0 when there is not a common master cell group configuration.

The apparatus may obtain configuration information for each of the first and second candidate PSCell from at least one other access point.

The apparatus may receive, from the terminal, signalling indicating that a failure condition occurred when the terminal attempted to connect with the first candidate PSCell, The apparatus may receive, from the terminal, signalling indicating that a connection with the second candidate PSCell will be, or is being attempted by the terminal.

The apparatus may transmit, to the terminal, a threshold for a quality metric for a link between the terminal and at least one of the first and second candidate PSCells. The quality metric may be a minimum acceptable quality that must be met by the link.

Figure 2:
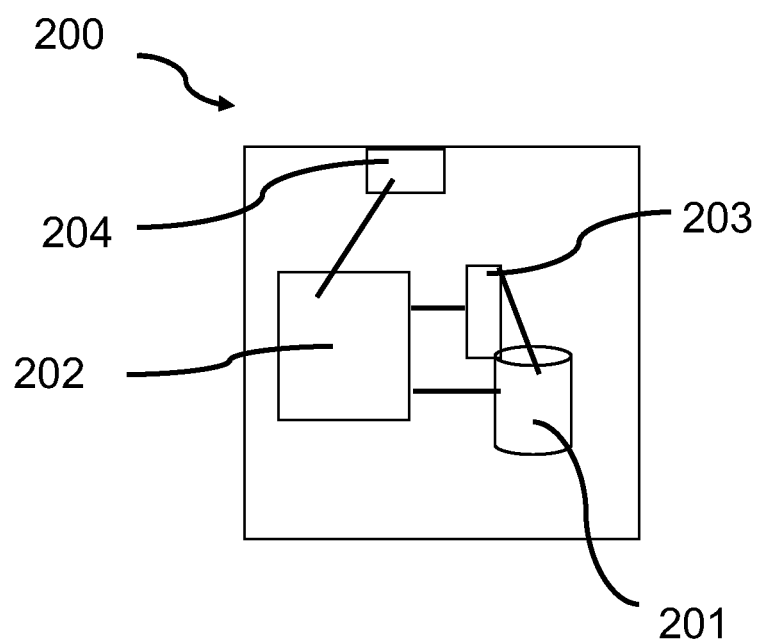
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
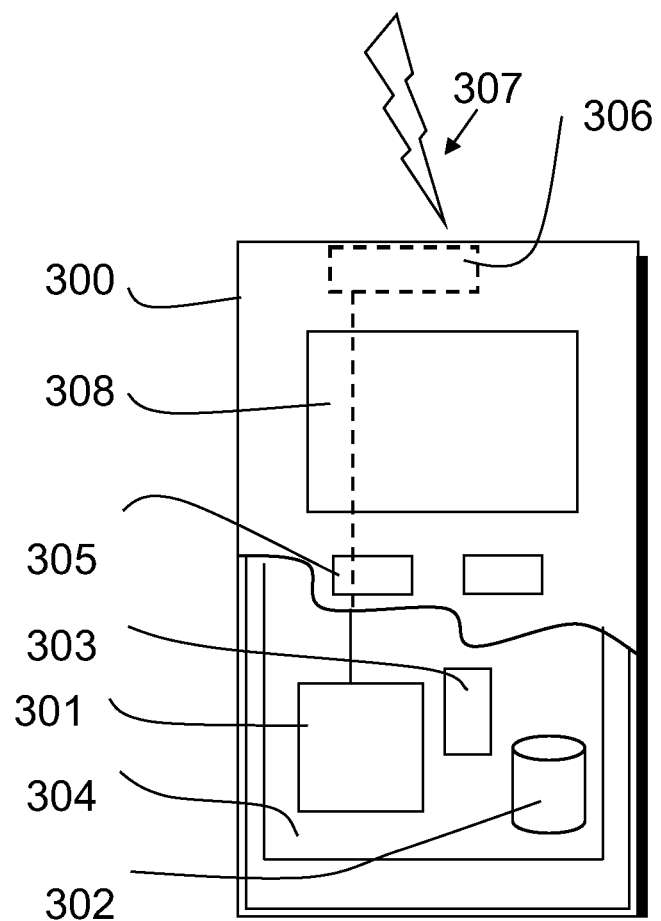
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. It is understood in the above that references to a UE include references to a terminal, as it is inessential for present purposes to consider a user of a terminal/UE. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
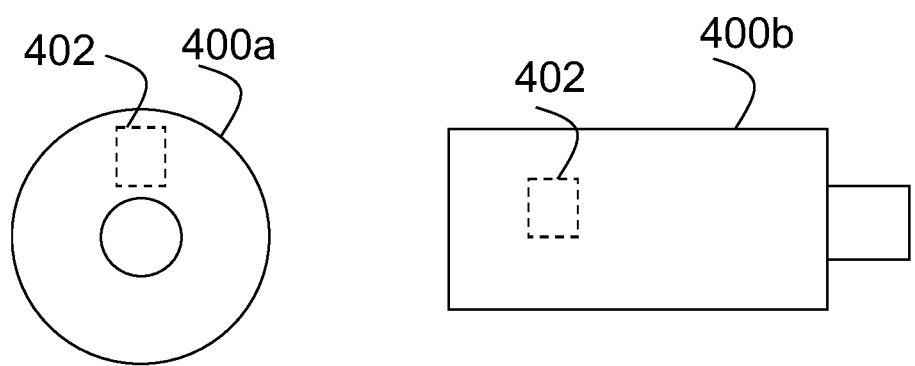
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 6 and/or FIG. 7.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 6 and/or FIG. 7, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a terminal, the apparatus comprising:
at least one processor; and
at least one memory comprising code that, when executed by the at least one apparatus, causes the terminal to:
receive, from a master access point, assistance information, the assistance information comprising configuration information for a first candidate Primary Secondary Cell, PSCell, and a second candidate PSCell, and a first indication of whether the first and second candidate PSCell are associated with a common master cell configuration;
determine a failure condition that occurred when connecting with the first candidate PSCell; and
use, in response to the determining, the first indication to determine whether to attempt to connect with the second candidate PSCell.

2. The apparatus according to claim 1, wherein the terminal is caused to, when it is determined to attempt to connect with the second candidate PSCell, transmit to the master access point a second indication that connection to the second candidate PSCell is being or will be attempted.

3. The apparatus according to claim 2, wherein the second indication comprises an indication of said failure condition.

4. The apparatus according to claim 1, wherein the terminal is caused to determine whether a quality of a link from the terminal to the second candidate PSCell is greater than a threshold value, and continue to connect to the second candidate PSCell when said quality is greater than the threshold.

5. The apparatus according to claim 1, wherein the terminal is caused to, when it is determined to not attempt to connect with the second candidate PSCell, send an indication of said failure condition.

6. The apparatus according to claim 1, wherein the first indication is comprised within a bitmap, each position in the bitmap corresponding to a conditional PSCell change configuration.

7. The apparatus according to claim 1, wherein the terminal is caused to:
receive from the master node a threshold for a quality metric;
measure a quality of a link between the apparatus and at least one of the first and second candidate PSCells during a connection establishment procedure; and
abandon the connection establishment procedure when the measured quality is below the threshold.

8. An apparatus for a master access point, the apparatus comprising:
at least one processor; and
at least one memory comprising code that, when executed by the at least one apparatus, causes the master access point to:
transmit, to a terminal, assistance information, the assistance information comprising configuration information for a first Primary Secondary Cell, candidate PSCell, and a second candidate PSCell, and a first indication of whether the first and second candidate PSCell are associated with a common master cell configuration.

9. The apparatus according to claim 8, wherein the master access point is caused to obtain the configuration information for each of the first and second candidate PSCell from at least one other access point.

10. The apparatus according to claim 8, wherein the master access point is caused to receive, from the terminal, signalling indicating that a failure condition has occurred when the terminal attempted to connect with the first candidate PSCell.

11. The apparatus according to claim 8, wherein the master access point is caused to receive, from the terminal signalling indicating that a connection with the second candidate PSCell will be, or is being attempted by the terminal.

12. The apparatus according to claim 8, wherein the first indication is comprised within a bitmap, each position in the bitmap corresponding to a conditional PSCell change configuration.

13. The apparatus according to claim 8,
wherein the master access point is caused to:

transmit to the terminal a threshold for a quality metric for a link between the terminal and at least one of the first and second candidate PSCells.

14. A method for an apparatus for a terminal, the method comprising:
- receiving, from a master access point, assistance information, the assistance information comprising configuration information for a first candidate Primary Secondary Cell, PSCell, and a second candidate PSCell, and a first indication of whether the first and second candidate PSCell are associated with a common master cell configuration;
- determining a failure condition that occurred when connecting with the first candidate PSCell; and
- using, in response to the determining, the first indication to determine whether to attempt to connect with the second candidate PSCell.

15. A method for an apparatus for a master access point, the method comprising:
- transmitting, to a terminal, assistance information, the assistance information comprising configuration information for a first Primary Secondary Cell, candidate PSCell, and a second candidate PSCell, and a first indication of whether the first and second candidate PSCell are associated with a common master cell configuration.

* * * * *